United States Patent
Alteheld et al.

(10) Patent No.: US 8,546,457 B2
(45) Date of Patent: Oct. 1, 2013

(54) METHOD FOR THE PRODUCTION OF ABRASIVE FOAMS

(75) Inventors: Armin Alteheld, Bad Kreuznach (DE); Klaus Hahn, Kirchheim (DE); Christof Möck, Mannheim (DE); Horst Baumgartl, Mainz (DE); Jens-Uwe Schierholz, Bensheim (DE); Maxim Peretolchin, Mannheim (DE)

(73) Assignee: BASF SE (DE)

( * ) Notice: Subject to any disclaimer, the term of this patent is extended or adjusted under 35 U.S.C. 154(b) by 446 days.

(21) Appl. No.: 12/672,807

(22) PCT Filed: Aug. 13, 2008

(86) PCT No.: PCT/EP2008/060611
§ 371 (c)(1),
(2), (4) Date: Feb. 8, 2011

(87) PCT Pub. No.: WO2009/021963
PCT Pub. Date: Feb. 19, 2009

(65) Prior Publication Data
US 2011/0124754 A1    May 26, 2011

(30) Foreign Application Priority Data
Aug. 14, 2007 (EP) .................................... 07114281

(51) Int. Cl.
*C08J 9/00* (2006.01)
*C08L 61/28* (2006.01)

(52) U.S. Cl.
USPC ............... 521/100; 521/187; 521/188; 524/6; 524/493

(58) Field of Classification Search
USPC ..................... 521/100, 187, 188; 524/6, 493
See application file for complete search history.

(56) References Cited

U.S. PATENT DOCUMENTS

| | | | |
|---|---|---|---|
| 3,653,859 A | 4/1972 | Zimmer, Jr. et al. | |
| 4,511,678 A * | 4/1985 | Mahnke et al. | ................. 521/52 |
| 5,437,754 A | 8/1995 | Calhoun | |
| 5,849,051 A | 12/1998 | Beardsley et al. | |
| 2003/0207954 A1 | 11/2003 | Hermann et al. | |

FOREIGN PATENT DOCUMENTS

| | | | |
|---|---|---|---|
| CA | 2293906 | | 7/2000 |
| DE | 3102567 | | 8/1982 |
| DE | 29808991 | | 9/1998 |
| EP | 0017672 A1 | | 10/1980 |
| EP | 1583831 | | 7/2006 |
| EP | 1742980 | | 1/2007 |
| EP | 1808454 | * | 7/2007 |
| JP | 9216163 | | 8/1997 |
| JP | H10-329031 A | | 12/1998 |
| JP | 2001-287152 | | 10/2001 |
| JP | 2003-175466 | | 6/2003 |
| JP | 2005-253852 A | | 9/2005 |
| NL | 1024682 C2 | | 5/2005 |
| WO | WO-99/24223 | | 5/1999 |
| WO | WO-01/94436 A2 | | 12/2001 |
| WO | WO-2005/100497 | | 10/2005 |
| WO | WO-2005/103107 A1 | | 11/2005 |
| WO | WO-2006/003421 | | 1/2006 |

OTHER PUBLICATIONS

International Preliminary Report on Patentability for PCT/EP2008/060611, issued Mar. 2, 2010.

* cited by examiner

*Primary Examiner* — Irina S Zemel
(74) *Attorney, Agent, or Firm* — Novak Druce Connolly Bove + Quigg LLP

(57) ABSTRACT

A process for production of an abrasive foam based on a melamine-formaldehyde condensate comprising inorganic nanoparticles, comprising the steps of:

Figure 1:
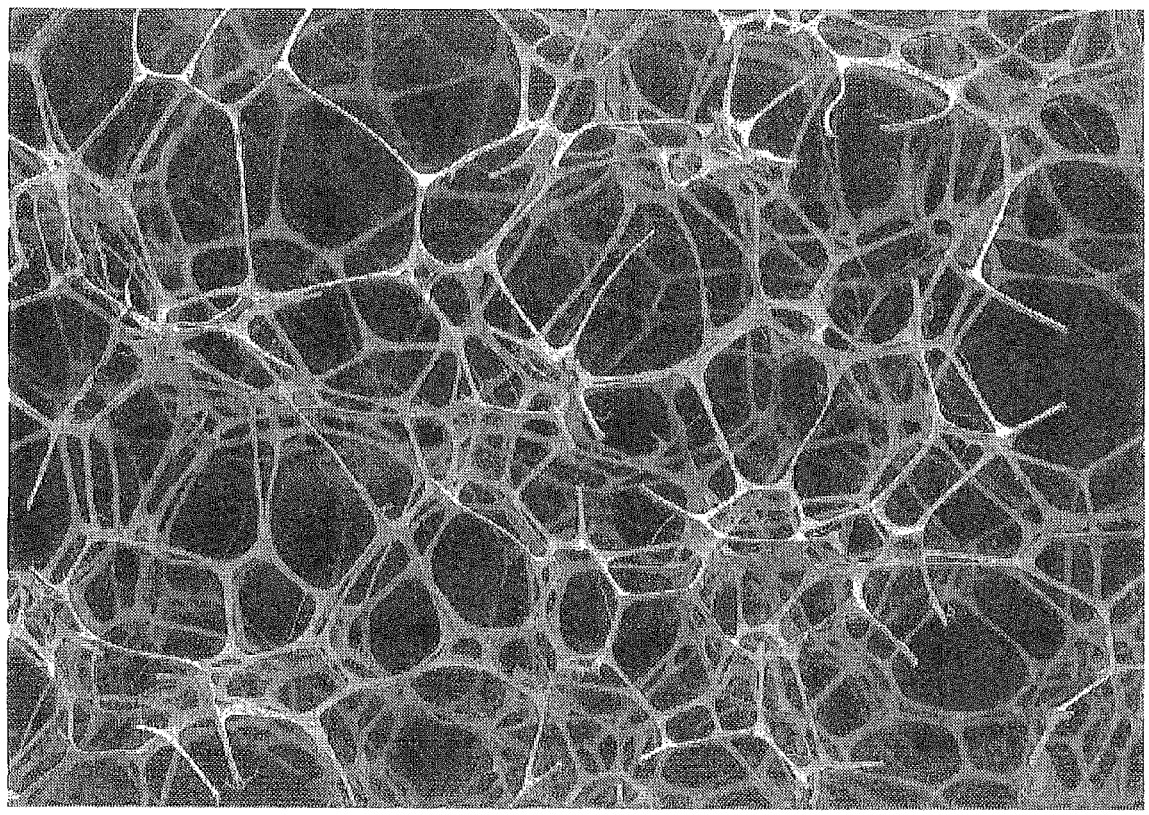

(1) preparation of a solution or dispersion comprising a precondensate of the foam to be produced, and also comprising inorganic nanoparticles, (2) foaming of the precondensate via heating of the solution or dispersion from step (1), in order to obtain a foam which comprises inorganic nanoparticles, and also, if appropriate, (3) heat-conditioning of the foam obtained in step (2), leads to improved abrasion in the polishing of delicate surfaces.

15 Claims, 2 Drawing Sheets

METHOD FOR THE PRODUCTION OF ABRASIVE FOAMS

CROSS-REFERENCE TO RELATED APPLICATIONS

This application is a national stage application (under 35 U.S.C. §371) of PCT/EP2008/060611, filed Aug. 13, 2008, which claims benefit of European application 07114281.4, filed Aug. 14, 2007.

BACKGROUND OF THE INVENTION

The present invention relates to a process for production of abrasive foams based on a melamine-formaldehyde condensate, and also to the products produced by this process. The process uses heating to foam a preferably aqueous solution or dispersion which comprises a melamine-formaldehyde precondensate, an inorganic component in the form of nanoparticles, and also, if appropriate, further components, such as an emulsifier, a blowing agent, a hardener, and also further additives. The foam can then be hardened via crosslinking of the precondensate and further processed to give various downstream products.

Inorganic nanoparticles are increasingly important in many sectors of industrial production. The particular properties of nanoparticle materials give them interesting possible uses ranging from chip technology to rubber production to medicine and cosmetics. Nanoparticles generally have physical and chemical properties markedly different from those of their coarse-grain analogs. This leads to particular possible applications, since it is possible to make a very high, and also chemically variable, surface area available for a small particle volume. For example, nanoparticles can be used for very effective scattering of energy arising within a material, and this has led by way of example to increased elasticity of tires and reduced rolling resistance in the rubber industry sector. However, inorganic nanoparticles are also useful in the household and cleaning sectors.

Various processes have been previously disclosed for production of foams and also of abrasive foams. For example, EP-A 017 672 described as early as 1979 elastic foams based on melamine-formaldehyde condensates, and also a process for their production. In this process, a highly concentrated solution or dispersion of a melamine-formaldehyde precondensate comprising a blowing agent is foamed and the foam is hardened. The foaming can take place via heating to a temperature above the boiling point of the blowing agent and can be carried out in such a way as in essence to delay any steep viscosity rise until the foaming procedure has been ended. The heating is preferably achieved with hot air, but can also use steam, high-frequency irradiation, or utilize heat of reaction. In EP-A 017 672 it is also possible to add pulverulent inorganic components as fillers or flame retardants to the foams.

The document NL-A 102 4682 describes open-cell rigid foams, for example based on melamine-formaldehyde, to which it is also possible to add inorganic additions prior to or after the foaming process. However, the materials involved here are not flexible melamine foams but rigid foams. These have physical properties which are different from those of the inventive flexible foams. The additions, such as sand, are not selected in NL-A 102 4682 with regard to increased abrasiveness of the foam.

The document WO 2006/003421 describes flexible polyurethane foams which can comprise nanoparticles based on phyllosilicates (e.g. cloisites).

WO 2005/100497 discloses plastics comprising pores and composed of a porous polymer, in which the pores have to some extent been filled with abrasive particles composed of metal oxides (e.g. composed of aluminum oxides, silicon oxides, titanium oxides, cerium oxides, zirconium oxides, germanium oxides, or magnesium oxides). These are used for the polishing of semiconductor elements, such as wafers. The polymers are based on polyurethanes and on polyolefins. In the examples section, a process is presented for the opening of pores during foaming via application of suction.

CA-A 2 293 906 describes foams for household applications, which are produced via impregnation of the upper layer of a roughened foam product with a coating which comprises abrasive additions, e.g. calcium carbonate, hollow glass microbeads, quartz, silicon carbide, or aluminum oxide.

JP-A 2001/287152 describes polishing pads for the surface treatment of wafers, which are obtained via impregnation of polyurethane foams with abrasive impregnation materials (e.g. silicon dioxide or cerium oxide) and a subsequent pressure process.

EP-A 1 683 831 discloses the addition of up to 5% by weight of inorganic nanoparticles to the components of a polyurethane, and subsequent foaming to give a polyurethane foam. Here, the nanoparticles are used as nucleating agents for foam-structure control.

U.S. Pat. No. 3,653,859 describes the impregnation of a foam with a dispersion which comprises abrasive additions.

US 2003/207954 describes polyurethane foams which can comprise abrasive additions, e.g. minerals, such as feldspar.

WO 1999/24223 also describes foams which have abrasive particles, e.g. composed of aluminum oxide or quartz.

JP-A 2003/175466 describes the impregnation of Basotect® foam (producer: BASF) with abrasive particles and with an elastomeric binder.

EP-A 1 742 980 describes the covalent linkage of inorganic nanoparticles to the cell-wall structure of Basotect, in order to achieve dirt-repellant action.

The German utility model DE 298 08 991 proposes, for the polishing of plastics surfaces, use of a polishing paste in which the abrasives have been dispersed in a carrier substance in which the viscosity falls under the conditions of the polishing procedure.

DE-A 31 02 567 discloses a paste for the polishing of metal surfaces, in which uniformly distributed portions of powder have been introduced into the melt of the paste, their hardness being between the hardness of the grinding particles and the hardness of the melt. Powders mentioned here are metal particles, such as copper powders, aluminum powders, zinc powders, and brass powders.

Familiar abrasives and polishing pastes often use fine-grain, high-hardness grinding particles, but these can, during the polishing procedure, lead to tiny scratches on the surface to be polished. In many sectors of technology (e.g. production of electronic components), but also in the household sector, these scratches on surfaces are undesirable. There are also foams used which do not have high and long-lasting elasticity and which therefore can be used only for a very restricted period, and this is undesirable for environmental reasons.

There are various ways of combining a foam with abrasive particles to provide an abrasive foam:
  impregnation of the foam with a dispersion of the particles (with addition of binder or else with covalent linkage),
  addition of abrasive particles to a polishing paste
  addition of abrasive particles to the precondensate prior to the foaming process, addition of abrasive particles to the starting materials in preparation of the precondensate and foaming in the subsequent step, a combination of the processes listed above.

BRIEF SUMMARY OF THE INVENTION

The inventive process in particular uses melamine-formaldehyde condensates. These firstly have high and long-lasting elasticity, and secondly intrinsically have markedly abrasive properties.

The melamine-formaldehyde condensates preferably used according to the invention have, after the foaming process, an elastic structure with numerous fine cell walls, but do not form membranes.

The melamine-formaldehyde precondensates that can be used in the inventive process for production of abrasive foams generally have a melamine:formaldehyde molar ratio in the range from 1:1.3 to 1:5. However, this ratio is preferably from 1:1.5 to 1:3.5. The molar ratio in the examples mentioned below is also within this range.

BASOTECT® (producer: BASF Aktiengesellschaft) is an elastic foam product on a large industrial scale and based on a melamine-formaldehyde condensate. It is often used for sound absorption and thermal insulation, and insulation of buildings, and for production of a cleaning sponge.

An object underlying the invention was to provide improved abrasive foams which can be produced simply and at low cost, and which permit effective polishing, and which do not lead to scratching of surfaces. The intention is also that these foams have a long lifetime. The intention is moreover that the improvement in abrasive properties is not achieved at the cost of elastic properties and of the appearance of the foam.

This object is achieved by providing a process for production of an abrasive foam based on a melamine-formaldehyde condensate comprising inorganic nanoparticles, comprising the steps of:

(1) preparation of a solution or dispersion comprising a precondensate of the foam to be produced, and also comprising inorganic nanoparticles and, if appropriate, comprising further added components (Z), (2) foaming of the precondensate via heating of the solution or dispersion from step (1) to a temperature of at least 60° C., in order to obtain a foam which comprises inorganic nanoparticles, and also, if appropriate, (3) heat-conditioning, at a temperature of from 120 to 300° C., of the foam obtained in step (2).

DETAILED DESCRIPTION OF THE INVENTION

The individual steps in the process and the various possible variations are described in more detail below. The starting materials for the process can either comprise melamine and formaldehyde or can comprise precondensates prepared at another location (or else commercially available) involving the two components, where these comprise condensates of moderate molecular weight.

The invention also provides a process for the production of abrasive foams comprising inorganic nanoparticles, in which one or more polymerizable components, and also, if appropriate, one or more dispersing agents or emulsifiers, and/or one or more substances with special effect (E) are introduced into a solvent, such as water, and the emulsion resulting therefrom (e.g. via vigorous stirring) is polymerized by introducing energy.

According to the invention, the solvent used preferably comprises water or else a mixture of water with a further water-miscible liquid. However, it is also possible in principle to use, as solvent, liquids other than water, or liquid mixtures. The solvent can also preferably comprise dissolved components, such as a dispersing agent or emulsifier.

In one particular embodiment of the invention, the foaming of the precondensate and the heat-conditioning of the foam take place in one step of the process.

It is also possible that the solution or dispersion in step (1) also comprises at least one emulsifier and/or at least one pH-regulating component. The solution or dispersion in step (1) also often comprises at least one emulsifier and at least one pH-regulating component. The inventive process for production of abrasive foams often begins by preparing an initial dispersion or solution, which comprises the "solvent", the monomers or the precondensate, the inorganic particles, and, if appropriate, further organic components. The initial dispersion here can be prepared in various ways. This initial dispersion can be further homogenized by introducing energy.

It can be advantageous to prepare the initial dispersion in a continuous process, and in principle it is also possible here to use a temperature increase.

The initial dispersion often comprises dispersing agents or emulsifiers, and/or protective colloids. These dispersing agents or emulsifiers, and/or protective colloids can in principle be added at any desired juncture to the initial dispersion, but they can also be present by this stage in the solvent during introduction of the inorganic components. Examples of suitable emulsifiers are commercially available dispersing agents and commercially available wetting agents.

In a further embodiment of the invention, a solution or dispersion is used in step (1) which comprises inorganic nanoparticles whose average particle size is smaller than 1000 nm, preferably smaller than 100 nm, e.g. from 1.5 nm to 100 nm, and in particular from 5 to 50 nm.

The inorganic nanoparticles used in step (1) can be selected by way of example from one or more compounds of the group consisting of silicon dioxide, titanium oxide, zirconium oxide, zinc oxide, magnetite, aluminum oxide, aluminum silicate, and lanthanide oxides (preferably cerium oxide), in each case preferably with average particle size smaller than 100 nm, in particular from 5 to 50 nm.

The solution or dispersion in step (1) preferably also comprises at least one blowing agent. The blowing agents that can be used are explained below. It is preferable to use at least one blowing agent from the group of the physical blowing agents, examples being alkanes, e.g. pentane.

In step (2) of the process, heating takes place to foam the precondensate. A foam can be obtained via heating of the solution or dispersion from step (1) to a temperature of at least 40° C., preferably at least 60° C. The precise temperature to be used also depends on the blowing agent used (e.g. on its boiling point). The heating in step (2) can by way of example take place via use of hot gases (such as air or inert gases) and/or via high-frequency irradiation (e.g. microwaves).

In one particular embodiment of the invention, the inorganic nanoparticle component consists essentially or else completely of silicon dioxide.

The amount present of the nanoparticle component in the solution or dispersion of step (1) is from 0.01 to 50% by weight, preferably from 1 to 15% by weight, based on the weight of the precondensate.

However, the amount of the nanoparticle component used can vary as a function of material and intended use. An amount of nanoparticle component(s) which has proven successful is from 1 to 10% by weight, based on the weight of the precondensate.

In one particular embodiment of the invention, the solution or dispersion of step (1) comprises not only at least one blowing agent, one emulsifier, and one pH-regulating component but also, as further added component, an odorant and/or a dye. The amount of these that can be present is, for example, from 0.01 to 2% by weight, based on the weight of the precondensate. These components lead to advantageous olfactory and, respectively, optical properties of the final product.

Step (3) of the process is in principle optional. The heat treatment can serve for hardening and can moreover markedly reduce the content of starting components (e.g. monomers). It is preferable to carry out the process in such a way that no free formaldehyde remains in the foam.

Dyes that can be used in the inventive process are in particular water-soluble compounds which are not leachable and whose thermal stability is moreover such that no alteration of the dye takes place in step (3) of the process.

Odorants that can be used are the conventional fragrances used in the perfumery sector and in detergent production. By way of example, an amount of from 0.1 to 5% by weight of a fragrance (such as vanillin) can be added to the monomers.

The invention also provides an abrasive foam that can be produced or has been produced by one of the processes described above. This abrasive foam generally comprises inorganic nanoparticles uniformly distributed in the polymer composition and having average particle size smaller than 100 nm. It can also comprise various types of nanoparticles, for example silicon dioxide nanoparticles (e.g. with average particle size of about 10 nm), and also cerium oxide nanoparticles (e.g. with average particle size of about 5 nm).

One particular embodiment of the invention provides moldings comprising an abrasive foam as described above. Simple production of variously shaped foam moldings is therefore possible, examples being a block, a cylinder, or else more complex shapes (e.g. shapes of animals).

The invention also provides abrasives comprising an abrasive foam as described above. It is possible to comminute the abrasive foam and, for example, also to use it in a mixture with other abrasives.

The present invention also provides the use of a foam, if appropriate in combination with further auxiliaries, as abrasive cleaner, abrasive, or abrasive polish.

A more detailed description follows of the individual steps (1) to (3) of the inventive process:

Step (1) of the inventive process comprises the preparation of a solution or dispersion comprising at least one precondensate of the foam to be produced and comprising at least one inorganic nanoparticle component. This process starts from a precondensate, preferably from a melamine-formaldehyde precondensate. The foam used in one preferred embodiment is based on a melamine-formaldehyde condensate.

These melamine-formaldehyde condensates can comprise, incorporated into the condensate, not only melamine but up to 50% by weight, preferably up to 20% by weight, of other thermoset-forming materials, and not only formaldehyde but also up to 50% by weight, preferably up to 20% by weight, of other aldehydes. However, preference is given to an unmodified melamine-formaldehyde condensate. Examples of thermoset-forming materials that can be used are urea, urethanes, carboxamides, dicyandiamide, guanidine, sulfurylamide, sulfonamides, aliphatic amines, glycols, phenol and its derivatives, and alkyl- and aryl-substituted melamine.

Examples of aldehydes that can be used are acetaldehyde, trimethylolacetaldehyde, acrolein, benzaldehyde, furfural, glyoxal, glutaraldehyde, phthalaldehyde, and terephthalaldehyde. Further details concerning melamine-formaldehyde condensates are found in Houben-Weyl, Methoden der organischen Chemie [Methods of Organic Chemistry], Volume 14/2, 1963, pages 319-402.

The molar melamine:formaldehyde ratio in the precondensate is generally in the range from 1:1 to 1:5. For production of particularly low-formaldehyde-content foams, the molar ratio is selected in the range from 1:1.3 to 1:1.8, and a precondensate free from sulfite groups is used, as described by way of example in WO 2001/94436.

The melamine resins can have sulfite groups incorporated into the condensate, and this can be achieved by way of example via addition of from 1 to 20% by weight of sodium hydrogen sulfite during the condensation of the resin. In one preferred embodiment, the melamine resin precondensates that can be used according to the invention comprise no sulfite groups, i.e. the sulfite group content should be below 1%, and preferably below 0.1%, particularly preferably being 0%.

The solution or dispersion comprising a precondensate of the foam to be produced and the nanoparticles can be prepared by processes known to the person skilled in the art. In one preferred embodiment, the appropriate precondensate is prepared in water. When preparing the precondensate it is possible to add alcohols, such as methanol, ethanol, or butanol, in order to obtain partially or completely etherified condensates.

Formation of the ether groups affects the solubility of the precondensate and the mechanical properties of the fully hardened material.

In one preferred embodiment, the nanoparticles present in the solution or dispersion which is prepared in step (1) of the inventive process have been selected from the group consisting of silicon oxide, cerium oxide, aluminum oxide, and mixtures thereof.

In another preferred embodiment of the invention, the solution or dispersion also comprises at least one emulsifier and/or at least one hardener.

The emulsifier used can comprise anionic, cationic, and nonionic surfactants, and also mixtures thereof.

Examples of suitable anionic surfactants are diphenylene oxide sulfonates, alkane- and alkylbenzenesulfonates, alkylnaphthalenesulfonates, olefinsulfonates, alkyl ether sulfonates, fatty alcohol sulfates, ether sulfates, α-sulfofatty acid esters, acylaminoalkanesulfonates, acylisothionates, alkyl ether carboxylates, N-acylsarcosinates, alkyl phosphates, and alkyl ether phosphates. Nonionic surfactants that can be used are alkylphenol polyglycol ethers, fatty alcohol polyglycol ethers, fatty acid polyglycol ethers, fatty acid alkanolamides, ethylene oxide/propylene oxide block copolymers, amine oxides, glycerol fatty acid esters, sorbitan esters, and alkyl polyglycosides. Examples of cationic emulsifiers that can be used are alkyltriammonium salts, alkylbenzyldimethylammonium salts, and alkylpyridinium salts.

The amounts preferably used of the emulsifiers are from 0.2 to 5% by weight, based on the precondensate.

Hardeners that can be used are acidic compounds which catalyze the further condensation of the melamine resin. The amount of these hardeners is generally from 0.01 to 20% by weight, preferably from 0.05 to 5% by weight, based in each case on the precondensate.

Suitable acidic compounds are inorganic and organic acids, for example those selected from the group consisting of hydrochloric acid, sulfuric acid, phosphoric acid, nitric acid, formic acid, acetic acid, oxalic acid, toluenesulfonic acids, amidosulfonic acids, anhydrides, and mixtures of these.

As a function of the selection of the precondensate, the solution or dispersion comprises a blowing agent. The amount of the blowing agent here in the solution or in the dispersion depends on the desired density of the foam. In principle, either physical or chemical blowing agents can be used in the inventive process. Examples of physical blowing agents that can clearly be used are hydrocarbons, such as pentane, hexane, halogenated hydrocarbons, in particular chlorinated and/or fluorinated hydrocarbons, such as methylene chloride, chloroform, trichloroethane, fluorochlorocarbons, partially halogenated fluorochlorocarbons (HCFCs), alcohols, such as methanol, ethanol, or isomers of propanol, ethers, ketones, and esters, such as methyl formate, ethyl formate, methyl acetate, or ethyl acetate, in liquid form, or air and carbon dioxide as gases. Examples of chemical blowing agents that can be used are isocyanates in a mixture with water, in which case carbon dioxide is liberated as effective blowing agent. Carbonates and bicarbonates in a mixture with acids are also suitable, and likewise generate carbon dioxide. Azo compounds, e.g. azodicarbonamide, are also suitable.

In one preferred embodiment of the invention, the solution or dispersion in step (1) of the inventive process also comprises at least one blowing agent. An amount of this blowing agent of from 1 to 40% by weight, in particular from 1.5 to 30% by weight, based on the precondensate, is preferably present in the solution or dispersion. It is preferable to add a physical blowing agent whose boiling point is from 0 to 80° C. If pentane is used as preferred blowing agent, it is preferable to use from 5 to 15% by weight of pentane, based on the precondensate.

In another embodiment, the solution or dispersion prepared in step (1) also comprises, apart from the at least one precondensate of the foam to be produced and apart from the nanoparticles, an emulsifier, and, if appropriate, a hardener and, if appropriate, a blowing agent.

In another embodiment, it is free from other additives. However, for some purposes it can be advantageous to add from 0.1 to 20% by weight, preferably less than 10% by weight, based on the precondensate, of conventional additives, e.g. dyes, flame retardants, UV stabilizers, agents for reducing the toxicity of fire gases, or agents for promoting carbonization.

It is also possible to add substances having special effect to the precondensate. One embodiment of the abrasive foams comprises at least one substance having special effect (E) from the group of the dyes, odorants, optical brighteners, UV absorbers, and pigments. This substance with special effect preferably has homogeneous distribution in the foam.

Pigments that can be used are the familiar inorganic natural pigments (e.g. chalk) or synthetic pigments (e.g. titanium oxides), or else organic pigments.

Substances that have special effect and that can be introduced into the foam, e.g. to increase whiteness, are optical brighteners whose bluish fluorescence (complementary color) compensates for graying and yellowing. In principle, any of the fluorescent dyes with blue emission is suitable, examples being the commercially available products such as Ultraphor® (BASF), Leucophor® (Clariant) or Tinopal® (Ciba), or other products from the following chemical classes of substance: stilbenes, distyrylbiphenyls, coumarins, naphthalimides, and the benzoxazole and benzimidazole systems linked by way of double bonds.

The optical brighteners can be fed separately or together with the precondensate to the preparation process. When the substance used with special effect comprises an optical brightener, its concentration is generally from 0.01 to 10%, based on the weight of the monomers.

The invention also provides abrasive foams which comprise an active ingredient (E). The active ingredient can, for example, be a biocide (e.g. a bactericide). The content of active ingredient can be controlled in targeted fashion in the inventive process and differs as a function of active ingredient. The content is generally from 0.001 to 20% by weight, based on the amount of the precondensate used.

The active ingredient here preferably has homogeneous distribution in the foam. Examples of biocides that can be used are various commercially available bactericides or algicides. Biocides are used in many sectors, and are used for control of bacteria, of fungi, or of algae. Organic biocides are preferably used as active ingredient in the invention. Examples of these substances are chloroisocyanurates, quaternary ammonium compounds (quats), hydantoins, isothiazolinones, parabenes, triclosan, 2-bromo-2-nitropropane-1, 3-diol, phenoxyethanol, or hexahydrotriazines.

Odorants that can be used in the inventive process are conventional substances which provide olfactory stimulation, examples being pleasant-smelling fragrances used in the perfumery sector (e.g. vanillin or citral). The use of fragrances in the nanoparticles is particularly of interest for use for household products and the cosmetics industry.

Since the foams prepared in the invention are generally open-pore foams and can absorb water, it can be advantageous for some intended purposes to add amounts of preferably from 0.2 to 5% by weight of hydrophobicizers. Examples of suitable hydrophobicizers are silicones, paraffins, silicone surfactants and fluoro-surfactants, aluminum stearates, hydrophobins, or fluorocarbon resins.

In another preferred embodiment, the solution or dispersion prepared in step (1) of the inventive process comprises an amount of from 55 to 85% by weight, particularly preferably from 63 to 80% by weight, of the precondensate. The viscosity of the solution or dispersion prepared of the precondensate is preferably from 1 to 3000 dPas, particularly preferably from 5 to 2000 dPas.

The nanoparticle component and any other additives present in the solution or dispersion are mixed, preferably homogeneously, with the solution or dispersion of the precondensate, and any blowing agent present here can also be injected under pressure. However, it is also possible to start from a solid, for example spray-dried, precondensate, and then to mix this with the nanoparticle component and with any other additives.

The mixing of the components can be undertaken using any of the processes known to the person skilled in the art, for example in an extruder. In one preferred embodiment, the solution or dispersion is discharged through a die and then immediately, in step (2), heated and thereby foamed.

In step (2) of the inventive process, the precondensate is foamed via heating of the solution or dispersion from step (1), to obtain a foam which comprises nanoparticles. For this, the solution or dispersion is heated, for example, to a temperature of at least 60° C.

In one preferred embodiment, hot gases or high-frequency irradiation can be used to heat the solution or dispersion prepared in step (1). It is particularly preferable that the required heating is carried out via ultrahigh-frequency irradiation. In this, by way of example, microwaves are used in the frequency range from 0.2 GHz to 100 GHz. It is preferable by way of example to use the frequencies of 0.915, 2.45, and 5.8 GHz, and radiation whose frequency is 2.45 GHz is particularly preferably used. An example of a radiation source for the dielectric radiation is a magnetron, and it is also possible to use a plurality of magnetrons simultaneously for irradiation. Care should be taken to maximize homogeneity of field distribution during irradiation, in order to avoid non-uniform heating and the associated non-uniform foaming.

The irradiation is preferably carried out in such a way that the power absorbed by the solution or dispersion is from 5 to 200 kW, preferably from 9 to 120 kW, based in each case on one kilogram of solution or dispersion. If the power absorbed is smaller, foaming ceases and the mixture then merely hardens. Within the preferred range, the mixture foams faster as power absorption increases. Above about 200 kW per kilogram of solution or dispersion, no further substantial increase in foaming rate occurs.

Irradiation of the mixture to be foamed preferably takes place immediately after it has been discharged from the foam die. The mixture here, foaming by virtue of a temperature increase and evaporation of any blowing agent present, is applied to circulating belts, which form a rectangular channel for molding to give appropriate moldings.

The foam obtained in step (2) of the inventive process is heat-conditioned, i.e. subjected to heat-treatment, in step (3) of the inventive process at a temperature of from 120 to 300° C. However, this step (3) can also be combined with step (2).

In step (3), the foams produced are preferably heated for from 1 to 180 min, particularly preferably from 5 to 60 min, to temperatures of from 120 to 300° C., preferably from 150 to 250° C., whereupon solvent and blowing agent remaining in the foam, and any formaldehyde present is substantially removed.

About 30 minutes of heat-conditioning at 220° C. are generally sufficient in practice for the inventive foams. Formaldehyde content measured to the EU standard EN ISO 14184-1 is then lower than 40 mg per kilogram of foam, preferably lower than 30 mg, particularly preferably lower than 20 mg. The test method mentioned extracts a foam specimen for one hour in water heated to 40° C., and determines the amount of extracted formaldehyde analytically.

The density of the inventively produced abrasive foams is preferably about 3 to 50 g per liter.

The present invention also provides a foam that can be produced by the inventive process. The present invention moreover provides a foam, preferably based on a melamine-formaldehyde condensate, comprising at least one nanoparticle component, where this component preferably has uniform distribution.

These sponges can be produced in the form of sheets, webs, or powder, or can be processed to give foam films (e.g. with a thickness of a few millimeters). The present invention moreover provides a molding comprising an inventive foam.

The present invention moreover provides an abrasive comprising an inventive foam.

The invention also provides the use of an inventive foam as abrasive. Because crosslinked melamine resins have high hardness, the foams can also be used for abrasive cleaning sponges, abrasive sponges, and abrasive polishing sponges. The open-cell structure of the foams also permits absorption and storage of suitable cleaners, and also of other abrasives and polishes, in the interior of the foams.

The sponges can also be modified hydrophobically and oleophobically for specific cleaning tasks. Because of low formaldehyde emission, the inventive foams can also be used in the hygiene sector. The inventive foam can moreover be used as a constituent of cleaners.

The examples below illustrate the invention.

Example 1

Foaming of a Precondensate with Addition of Abrasive Nanoparticles

For production of a modified melamine resin foam in which the abrasive particles are incorporated into the foam simultaneously with the foaming process, 70 parts by weight of melamine-formaldehyde precondensate (with molar ratio 1:1.6) were dissolved in 30 parts by weight of an aqueous dispersion of colloidal silicon dioxide particles (solids content 45% by weight, average particle size 30 nm) before an emulsifier (3% by weight of an ethoxylated fatty alcohol having more than 20 ethylene oxide units), pentane (10% by weight), and formic acid (3% by weight) were added.

The mixture was then stirred and then foamed in a polypropylene (foaming) mold via irradiation with microwave energy at 2.54 GHz.

The product was heat-conditioned at a temperature of 220° C. for 30 minutes after the foaming process.

The foam structure of the foam, and its mechanical properties, its thermal stability, and its fire performance, do not differ significantly from those of a comparative foam produced without addition of the nanoparticles.

When the inventive foam of this example is inspected in scanning electron micrographs, there is found to be a thin layer composed of inorganic nanoparticles formed on the surface of the cell walls of the foam, the result being a possible significant rise in the abrasivity of the material.

Nanostructuring of the cell-wall surface via the inorganic particles or via agglomerates formed could be observed.

Example 2

Preparation of a Precondensate with Addition of Abrasive Nanoparticles 367.4 g (6.0 mol) of formaldehyde (49%) and 280.0 g of distilled water were used as initial charge in a 4 liter four-necked flask, and adjusted to pH 8.8 using 0.5 ml of sodium hydroxyide solution (NaOH, 25%). 30.8 g of an aqueous dispersion of colloidal silicon dioxide (solids content 40%, average particle size about 15 nm), followed by 472.5 g (3.75 mol) of melamine, were then added.

The mixture was heated to 98° C. and stirred at 98° C. and pH 8.8 (compensated) as far as the cloud point CP (1:5)=45° C. Once the cloud point had been reached, an icebath was used for cooling to room temperature. During cooling to room temperature, the pH rose to 9.5-10 as a consequence of temperature compensation.

Example 3

Foaming of a Precondensate Comprising Nanoparticles

The precondensate obtained in example 2 was directly used for foaming and was foamed as follows:

10 parts by weight of the precondensate obtained in example 2 were added in 3% by weight of an emulsifier composed of an ethoxylated fatty alcohol (more than 20 ethylene oxide units), and also 3% by weight of formic acid, and 10% by weight of pentane, in each case based on resin.

The mixture was then stirred and then foamed in a polypropylene (foaming) mold via irradiation with microwave energy at 2.54 GHz.

The foam structure of the foam obtained, and its mechanical properties, its thermal stability, and its fire performance, do not differ significantly from those of a comparative foam produced without addition of the nanoparticles.

Example 4

Testing of Abrasive Properties of the Foam

An abrasive foam with nanoparticles according to example 1 and a foam produced according to example 1 without nanoparticle addition were tested for abrasive properties in a comparative experiment.

The two foams were first moistened with water. A smooth aluminum plate (area 20 cm×20 cm) was polished manually with each of the two foams. The polishing procedure here used the same pressure and the same number of circular movements (50 cycles). Once the treatment had ended, the surface was evaluated visually.

The surface treated with the abrasive foam according to example 1 had marked abrasion traces. The specimen treated with the comparative material had only relatively slight abrasion traces.

FIG. 1 shows the microscopic structure of the inventive foam of example 1 in a scanning electron micrograph. The foam is a completely open-cell foam. The structure of the inventive foam corresponds to that of an unmodified foam. In FIG. 1, 1.5 cm on the micrograph correspond to about 100 µm; the high-voltage setting for the micrographs was 5 kilovolts.

Figure 2:
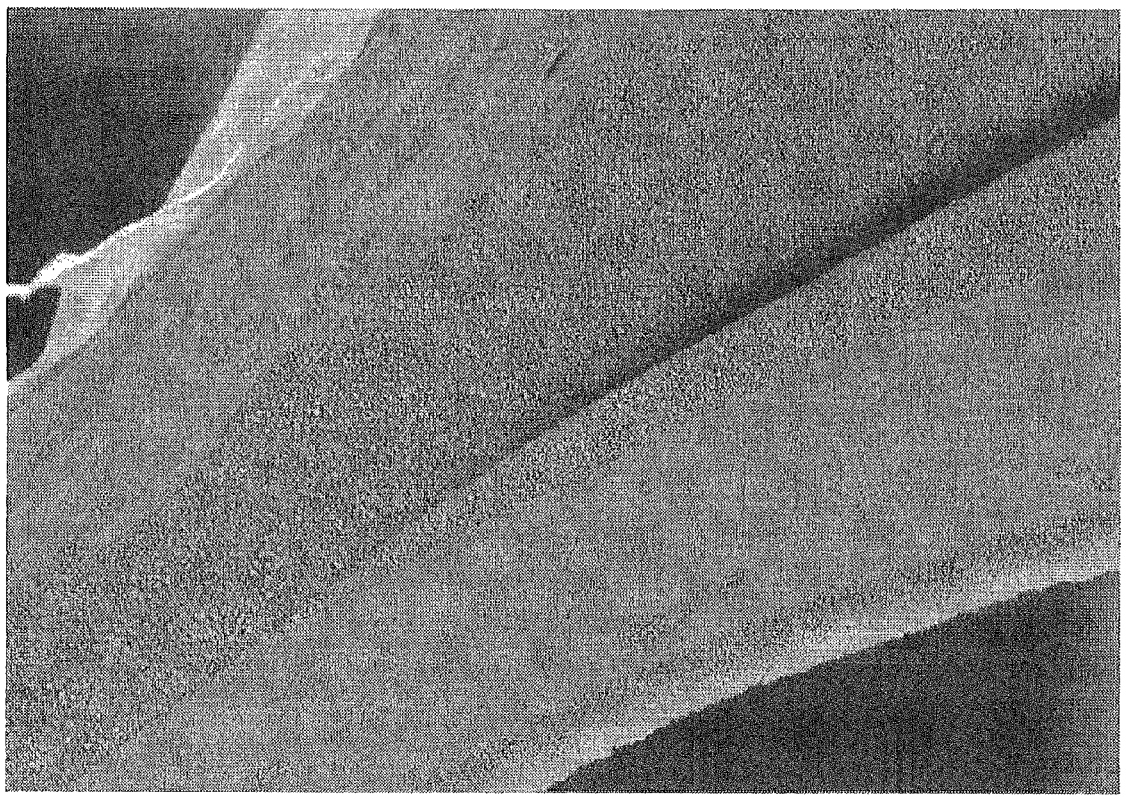

FIG. 2 shows the nanostructuring of the surface of the cell walls of the inventive foam. This fine layer composed of inorganic nanoparticles is particularly present on the surface of the cell walls. Abrasivity can be raised via the nanoparticles at the surface of the foam. In FIG. 2, 1 cm on the micrograph corresponds to about 1 µm.

The invention claimed is:

1. A process for production of an abrasive foam based on a melamine-formaldehyde condensate comprising inorganic nanoparticles, comprising the steps of:
   (1) preparing a solution or dispersion comprising a precondensate of the foam to be produced, and also comprising inorganic nanoparticles and comprising at least one physical blowing agent whose boiling point is from 0 to 80° C., and optionally further comprising added component (Z),
   (2) foaming of the preconcensate via heating of the solution or dispersion from step (1) to a temperature of at least 60° C., in order to obtain a foam which comprises inorganic nanoparticles, and optionally,
   (3) heat-conditioning, at a temperature of from 120 to 300° C., of the foam obtained in step (2).

2. The process according to claim 1, wherein the foaming of the preconcensate and the heat-conditioning of the foam take place in one step of the process.

3. The process according to claim 1 wherein the solution or dispersion in step (1) also comprises at least one emulsifier and/or at least one pH-regulating component.

4. The process according to claim 1, wherein the solution or dispersion in step (1) comprises inorganic nanoparticles whose average particle size is smaller than 1000 nm.

5. The process according to claim 1, wherein the solution or dispersion in step (1) comprises inorganic nanoparticles whose average particle size is smaller than 100 nm.

6. The process according to claim 1, wherein the solution or dispersion in step (1) comprises inorganic nanoparticles selected from one or more compounds of the group consisting of silicon dioxide, titanium oxide, zirconium oxide, zinc oxide, magnetite, aluminum oxide, aluminum silicate, and lanthanide oxide, in each case with average particle size of from 5 to 50 nm.

7. The process according to claim 1, wherein the at least one blowing agent is an alkane.

8. The process according to claim 1, wherein the heating in step (2) takes place via the use of hot gases and/or via high-frequency irradiation.

9. The process according to claim 1, wherein the inorganic nanoparticle component consists essentially of silicon dioxide.

10. The process according to claim 1, wherein the amount present of the nanoparticle component in the solution or dispersion of step (1) is from 0.01 to 50% by weight, based on the weight of the precondensate.

11. The process according to claim 1, wherein the amount present of the nanoparticle component in the solution or dispersion of step (1) is from 1 to 10% by weight, based on the weight of the precondensate.

12. The process according to claim 1, wherein the solution or dispersion of step (1) comprises at least one blowing agent, an emulsifier, a pH-regulating component, and, as further added component, an odorant and/or a dye, in an amount of from 0.01 to 2% by weight, based on the weight of the precondensate.

13. An abrasive foam that can be produced by a process for production of an abrasive foam based on a melamine-formaldehyde condensate comprising inorganic nanoparticles, comprising the steps of:
   (1) preparing a solution or dispersion comprising a precondensate of the foam to be produced, and also comprising inorganic nanoparticles and comprising at least one physical blowing agent whose boiling point is from 0 to 80° C., and optionally further comprising added component (z),
   (2) foaming of the preconcensate via heating of the solution or dispersion from step (1) to a temperature of at least 60° C., in order to obtain a foam which comprises inorganic nanoparticles, and optionally,
   (3) heat-conditioning, at a temperature of from 120 to 300° C., of the foam obtained in step (2);
   wherein the abrasive foam has an open cell structure and a density of 3 to 50 g per liters.

14. The abrasive foam according to claim 13, comprising uniformly distributed inorganic nanoparticles whose average particle size is smaller than 100 nm.

15. A molding, comprising the abrasive foam according to claim 13.

* * * * *

UNITED STATES PATENT AND TRADEMARK OFFICE
CERTIFICATE OF CORRECTION

PATENT NO.         : 8,546,457 B2                                    Page 1 of 1
APPLICATION NO.    : 12/672807
DATED              : October 1, 2013
INVENTOR(S)        : Alteheld et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Fifteenth Day of September, 2015

Michelle K. Lee
*Director of the United States Patent and Trademark Office*